United States Patent [19]

Arild et al.

[11] 4,350,442

[45] Sep. 21, 1982

[54] LIGHT AND COLOR DETECTING SCANNER FOR A SORTING APPARATUS

[75] Inventors: Tor Arild, Woodside; Russell R. Ames, San Jose, both of Calif.

[73] Assignee: Accusort Corporation, Belmont, Calif.

[21] Appl. No.: 687,950

[22] Filed: May 19, 1976 (Under 37 CFR 1.47)

[51] Int. Cl.$^2$ .......................... G01J 3/5; G01N 21/26

[52] U.S. Cl. ...................................... 356/51; 209/587; 209/582; 356/407; 356/416; 356/445; 209/577; 209/908

[58] Field of Search .................. 356/51, 173, 176-178, 356/186, 189, 209-212, 200, 199; 209/111.5, 111.6, 111.7 R

[56] References Cited

U.S. PATENT DOCUMENTS

| | | | |
|---|---|---|---|
| Re. 29,031 | 11/1976 | Irving et al. | 356/178 X |
| 3,206,606 | 9/1965 | Burgo et al. | 356/200 X |
| 3,283,896 | 11/1966 | Jirik et al. | 209/111.6 |

*Primary Examiner*—F. L. Evans

*Attorney, Agent, or Firm*—Limbach, Limbach & Sutton

[57] ABSTRACT

An optical scanner for light detection and color ratiometric measuring for use in apparatus to sort small particles such as seed and beans which are projected or propelled through the scanner at relatively high speeds to be scanned on all sides by a narrow light plane and viewed by a plurality of photoelectric devices. Several lamps are used in conjunction with cylindrical lenses to produce a substantially uniform collimated light plane perpendicular to the path of the particles. The lamps and lenses are interspersed with the photoelectric devices such that light reflected from the portion of the particle being scanned is detected by the photoelectric devices which are responsive to selected wavelengths and which responses are separately fed to an external electronic circuit for processing according to spectral responses such that said responses can be measured individually or compared with each other to determine certain color characteristics of the particle being scanned.

24 Claims, 13 Drawing Figures

FIG. 1
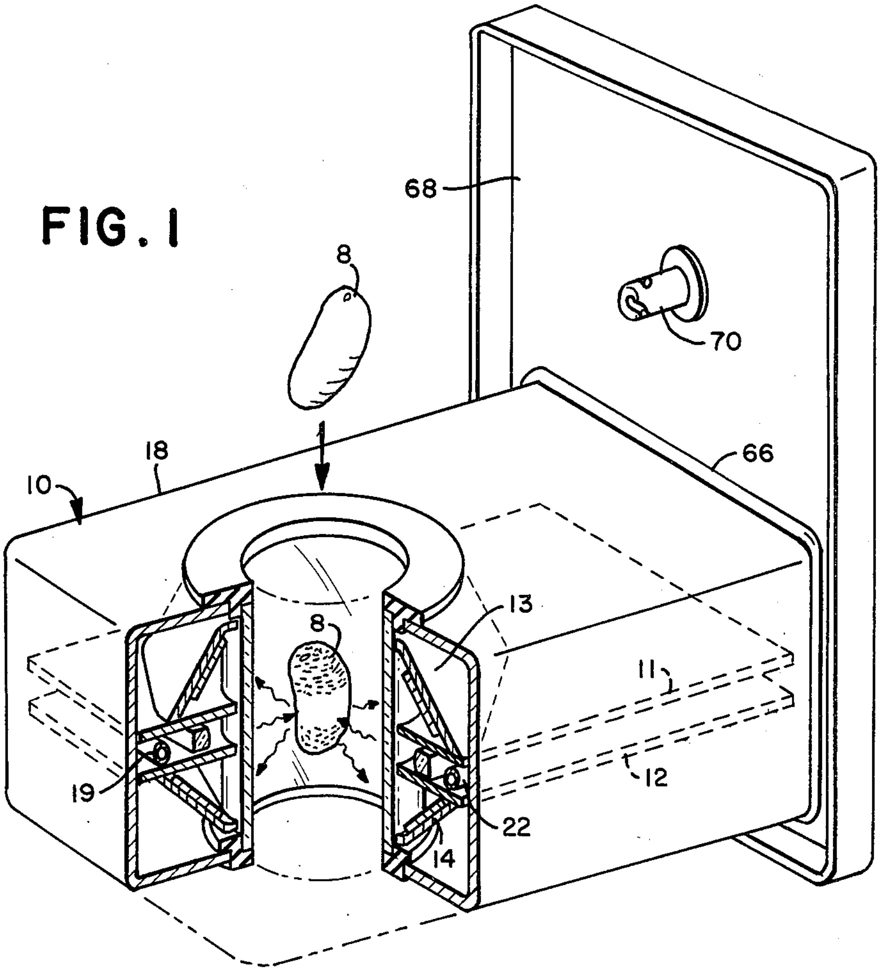
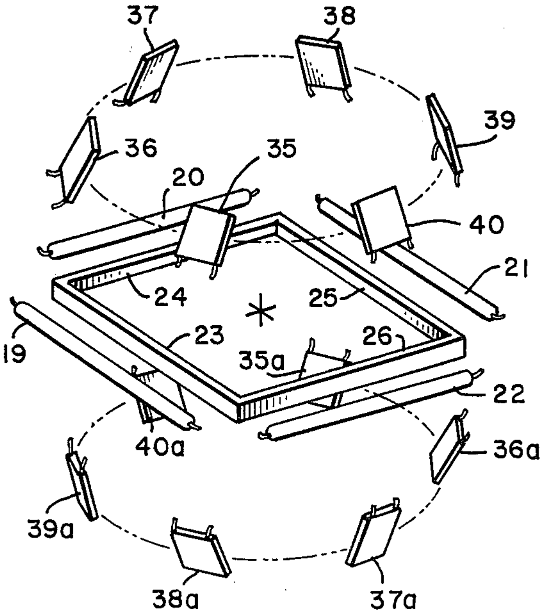
FIG. 2

FIG. 6
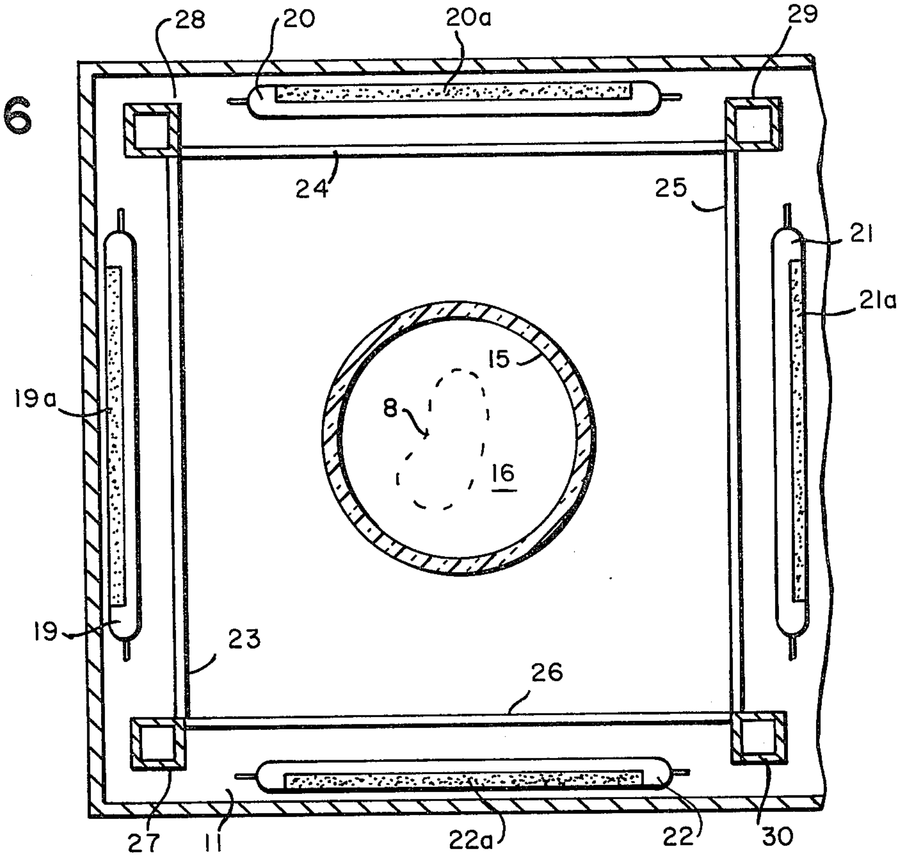
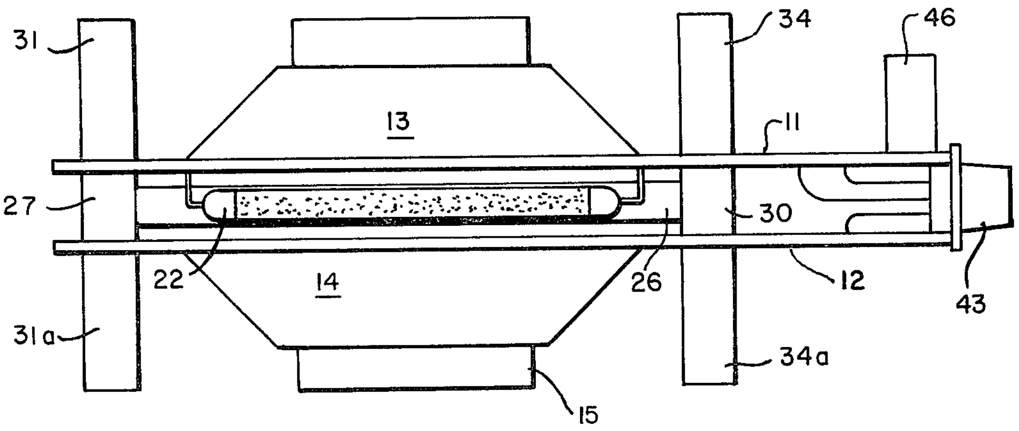
FIG. 7

LIGHT AND COLOR DETECTING SCANNER FOR A SORTING APPARATUS

CROSS-REFERENCES TO RELATED APPLICATIONS

Ser. No. 687,949, filed May 19, 1976, the same day as the present application: CONTROL APPARATUS FOR SORTING PRODUCTS, William F. Marshall and Tor Arild, and assigned to the present assignee.

Ser. No. 687,981, filed May 19, 1976, the same day as the present application, entitled: A FEED WHEEL FOR A SORTING APPARATUS, Tor Arild and Russell R. Ames, and assigned to the present assignee.

BACKGROUND OF THE INVENTION

This invention relates to a color ratiometric optical scanner for sorting small particles such as beans and seeds. Such articles must be sorted on an individual basis with great discrimination accuracy in order to detect the various blemishes and color irregularities that exist. Since the aforementioned articles have a very low unit cost it is essential that the discrimination accuracy be coupled with high speed operation in order to make color sorting of these articles economically feasible.

Light detecting and colorimetric methods have been used for some time to discriminate the color or reflected light of various articles such as fruit, nuts, beans, tiles, roasted peanuts, etc. Information from previous optical heads has been used to sort, reject or control, for example, the color of roasted peanuts. Much of the apparatus to date has been relatively complex and expensive. Also previous sorting devices have suffered because the particles are usually not of uniform size and therefore past attempts at providing light detecting means for sensing blemishes and color irregularities usually have had the disadvantage of not being able to discriminate size variations from color and blemish variations. Other difficulties affecting the accuracy of previously used devices have often been such common problems as optical referencing and electronic drift and noise. Whereas noise performance must be designed in, problems of drift and instability of control has often been overcome only at the time-consuming penalty of interrupting the sorting operation to accommodate periodic readjustment, nulling or referencing.

In the sorting of the aforementioned products, it is necessary to discriminate between various types of defects such as discoloration, water or stain damage, which discolors the entire product, as well as very small blemishes and discolored areas which affect only a portion of the product. Additionally, it is necessary to allow for the fact that some products may have a variation in color on a portion of the product such as the "black eye" in a blackeyed pea, which can in currently known high speed sorting apparatus cause that object to be labeled as an undesirable product when in fact the discoloration is a normal condition. For products that vary in size but are sorted for color criteria the color ratiometric system is the best since it is not size sensitive.

However, one major problem with color ratiometric sorting is that the color shades that must be discriminated are usually subtle. In a color ratiometric system, two regions of the electromagnetic spectrum are chosen to provide the maximum discrimination. The energy from one spectral region is divided by the energy from another spectral region to provide a value that is used for control or comparison against a standard for threshold information which is the basic for acceptance or rejection of the product being tested. When color hues are subtle (such is generally the requirement when grading beans for instance), variations of approximately one percent (1%) in the ratio represents the acceptable threshold drift allowed inasmuch as manual ratio-threshold adjustments on the order of one percent (1%) often make the difference between economically profitable and unsatisfactory sorting operations when the product upgrading and wastage of these articles is considered.

Thus it can be seen that relative drift in the gain of the photo channels amounting to more than one percent (1%) is prohibitive. There are several causes of relative gain drift between channels and the most offensive is the optical detector's sensitivity drift. Other causes are lamp color temperature variations (usually due to lamp aging) and the analog divider drift, especially occurring if the log-antilog semiconductor variety is used. Using present day precision resistors and high gain operational amplifiers the detector amplifier gain drift is less of a problem and gain stability of 1 part in 1000 is obtainable. In prior systems, photo multipliers and cadmium sulphide optical detectors have been used. Photo multipliers have high sensitivity but suffer a constant gain degradation that does not necessarily match between any two of them. Also, the requirement for an extremely stable dynode voltage supply is a significant cost factor in their use. Cadmium sulphide cells suffer "light history" effects and exhibit temperature related gain variations that also do not necessarily track between similar units.

In order to compensate for these gain variations just discussed, many existing systems compare against a standard. The standard is usually a color background that does not vary. This color background is measured on a regular basis (perhaps between every object being viewed) and a gain correction is made. While this is an ideal method of gain compensation, the logistics of placing a standard object in the stream of objects being sorted is a difficult mechanical problem. Therefore, when a color standard must be used, it is most commonly implemented by placing a color background standard placard opposite each photodetector used so that each detector views the placard between articles being sorted. The use of such background reference placards however imposes limiting geometric restrictions on such apparatus since each placard must fill the entire field of view of its related photodetector if extraneous color information is to be excluded.

To compensate one must employ a small number of wide-viewing detectors or else a larger number of narrow-viewing detectors since the mounting positions reserved for placards cannot be used for photocells as well. In either case it is not possible to use a large number of detectors with widely over-lapping fields of view if color background standards are required for gain stability. Furthermore, the modified gain information must be electronically stored since the background reference signal and product signal do not occur at the same time. An additional and serious objection to the use of background color standards is their inevitable degradation due to the dust, dirt and smudging common to the warehouse environment. Another common method to compensate for drift, etc. is to optically chop the signals and have a single detector channel. Again, this is an ideal gain compensation method but the mechanical complications of chopping the optical signal especially when the optical field of view should be spherical makes for a very complex optical head. Chopping also imposes a band width limitation that often limits the rate at which items may be sorted.

Because of the complexity of employing the methods described above, prior art optical heads generally have not viewed the entire surface of the product being sorted, thus missing marks and blemishes. A more pronounced failing of previous systems is the inability to allow for the common marks which are characteristics of the product, i.e. the red spot on a "red-eye bean". If the entire surface of the bean is not viewed, the spot, depending on the bean orientation, will or will not be seen by the field of view thereby causing a variation that should not be included in the color measurement criteria. In addition to standard color backgrounds, prior art apparatus have also utilized fairly precise optical slits placed in front of the photo detectors which then requires sophisticated lens systems and additionally severely limits the area of the photo detector viewing the objects, thus reducing the signal level, making it more susceptible to electronic noise.

Thus it can be seen that prior art apparatus in order to be economically feasible and practicable will generally be a compromise in design between extreme complexity requiring low operator skill as well as maintenance, and less complex design coupled with higher operator skill requirements and additional maintenance, setup and adjustment requirements. Since users of this type of sorting apparatus rarely operate said apparatus under conditions which approach laboratory conditions, i.e. a great deal of dust and dirt is fairly common when sorting the aforementioned products, and further since the labor force available to the users are generally of a lower than average technical skill level and sophistication, it can be seen that it is generally difficult to obtain operators that possess the skills required to set, adjust and maintain the sophisticated apparatus currently available and described in prior art disclosures. Additionally, because of the complexity of the apparatus and the lack of skilled operators, a substantial amount of hand sorting is required after machine sorting in order to render the product marketable. Since the sorting of said products is generally a low profit margin operation, losses of marketable product due to improper setting of the aforementioned apparatus cannot be tolerated. Users of such apparatus are, therefore, constantly searching for designs which require less skilled operators, pose fewer setup and maintenance problems and are relatively insensitive to the dust and dirt encountered in normal operation.

It is, therefore, the primary object of this invention to provide a compact, economical light and color detecting scanner for accurately detecting very small as well as larger diffuse color irregularities and blemishes in articles, and which is capable of recognizing and allowing for normal localized color variations in certain articles, which device is insignificantly affected by the size of the articles being sorted or by dust deposits encountered during normal operation and which does not require operator adjustments for the sorting of different products.

A further object of this invention is to provide a light detecting scanner which minimizes photo detector drift, eliminates optical referencing as well as limiting the field of view of the photo detectors in a simple, compact, economical optical assembly specifically adapted for, but not limited to, the sorting of bean seeds and nuts.

SUMMARY OF THE INVENTION

An optical scanner for light detection and color ratiometric measuring comprising the combination of a transparent channel through which the articles are propelled randomly one at a time at relatively high speeds, typically 3,000 articles per minute, said transparent channel being surrounded by a plurality of lamps and cylindrical lenses evenly dispersed in a single plane extending perpendicular to the path of the articles for generating a collimated homogenous "sheet" of light through which the articles pass. Light reflected from the articles is uniformly measured by a plurality of photodiodes having specific spectral responses, said photodiodes being positioned symmetrically in a substantially spherically spaced relationship above and below said "sheet" of light. The fields of view of said photodiodes are not restricted in order to achieve good signal-to-noise ratio and the fields of view overlap considerably, thus the reflected light from each portion of the product scanned falls upon the photodiodes of differing spectral responses. The photodiodes are positioned in such a manner as to receive no direct light from the illumination sources. The scanner is configured in modular form to facilitate simple and inexpensive construction and replacement combined with the high degree of optical accuracy required for ratiometric color sorting.

BRIEF DESCRIPTION OF THE DRAWINGS

FIG. 1 is a partly cut-away, partly phantomed, perspective view of a preferred embodiment of the invention.

FIG. 2 is an exploded perspective view of portions of the embodiment of FIG. 1, showing particularly the arrangement of the light sources, collimating lenses and photo detectors.

FIG. 6 is a cross-sectional plan view along the section line 6—6 of FIG. 5.

FIG. 7 is a side elevational view of the assembled light transmitting and detecting head portion of the embodiment of FIG. 1.

DESCRIPTION OF THE PREFERRED EMBODIMENTS

Figure 3:
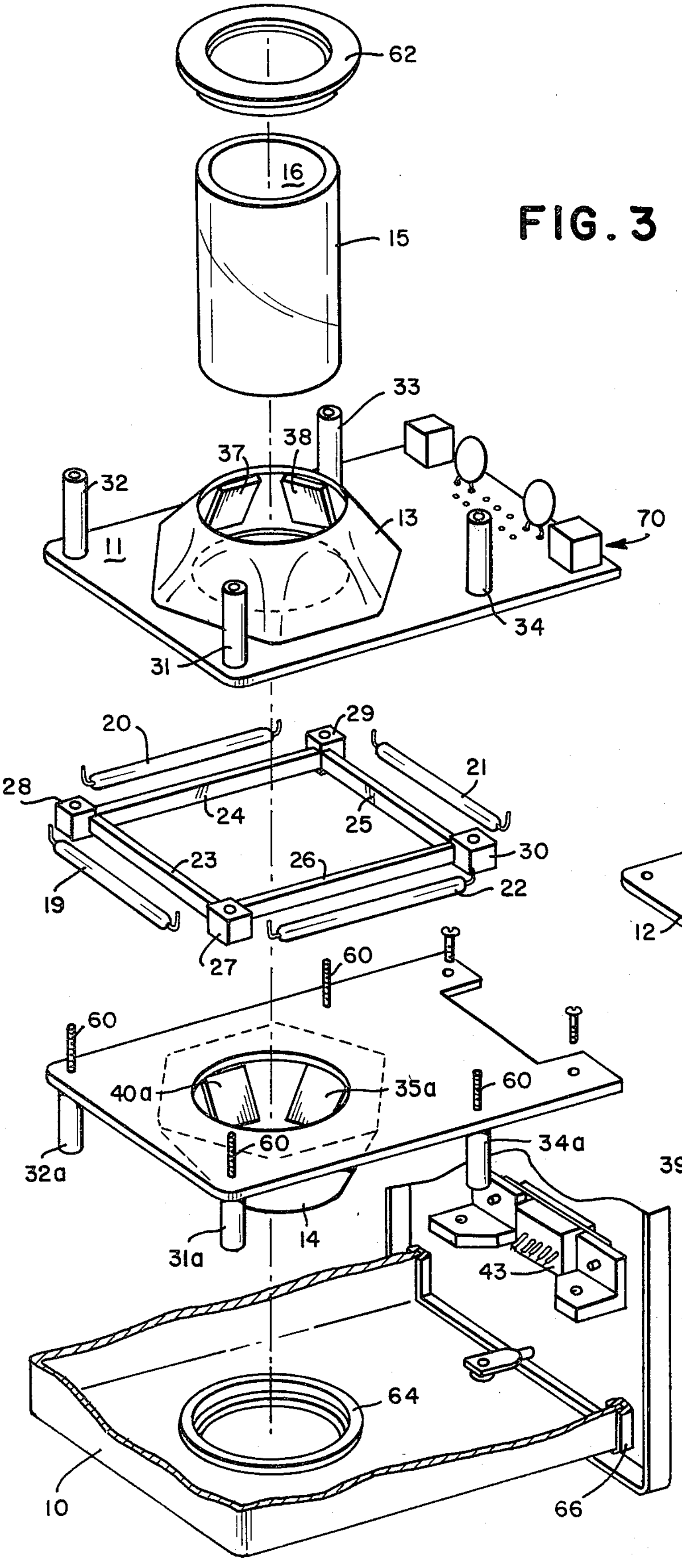
FIG. 3 is an exploded perspective view of portions of the embodiment of FIG. 1, showing particularly the mounting arrangement of the light sources, collimating lenses and photo detectors.
Figure 4:
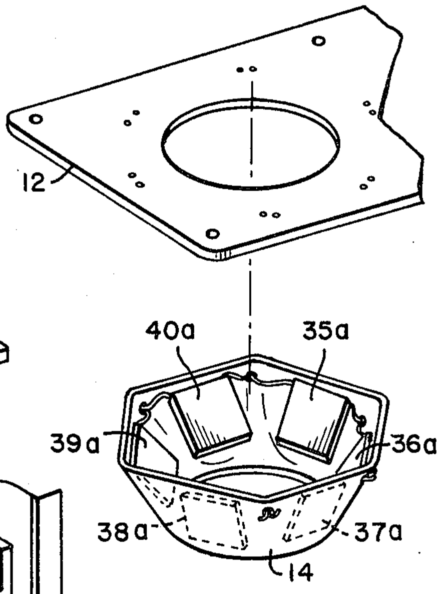
FIG. 4 is an exploded perspective view of portions of the embodiment of FIG. 1, showing particularly the lower photo detector holding cone and the board to which the cone is attached.

It will be seen that this invention seeks to overcome the problems encountered in prior apparatus by eliminating optical referencing, photo detector drift and field of view limitations.

A preferred circuit usable with the present invention is disclosed in said above identified copending application entitled, CONTROL APPARATUS FOR SORTING PRODUCTS.

In considering the gain stability of the two color channels where constant gain correction is not required, a stable long life, light source is essential. Also needed are detectors that track with temperature and exhibit long term gain stability. Since the color variations in products to be processed are those apparent to the eye, the first choice of spectral regions might well be in the visible spectrum. For the best spectral differentiation within the visible band, blue and red can be chosen. This requires a stable light source with high emission in the blue (high color temperature). A tungsten filament lamp is a suitable choice, but in order to obtain sufficient blue emission the filament must be run hot (approx. 2900° K.) which severely limits its life. Another side effect occurs as the lamp ages, the filament gets thinner and runs hotter thus increasing the blue signal relative to the red. A further side effect is deposition of tungsten on the glass envelope which causes an uncontrollable spectral shift. It can therefore be seen that systems using this approach must constantly reference optically and that lamps must be changed with greater frequency. The spectral stability and operating life of a tungsten filament lamp may be greatly improved by running the lamp at a reduced power level. This, however, reduces the color temperature of the lamp and thus diminishes the blue emission available. In order to restore blue sensitivity it is now necessary to use a detector which is extremely sensitive to blue light but relatively insensitive to the spectrally adjacent visible red emission. Satisfying this requirement with available photodetectors having satisfactory aging and thermal drift characteristics is difficult unless one resorts to the use of expensive filters of the narrowband or interference type.

Spectrophotometer tests on a wide variety of bean types show that the reflected infrared signal varies closely with the size of the article but only negligibly relative to the visually perceptible color variations upon which beans are graded, whereas the reflected signal in the visible portion of the spectrum varies considerably relative to the visual color variations as well as relative to the size of the article.

In accordance with the teachings of the present invention, the symmetrical positioning of a large number of visible and infrared-sensitive detectors with their widely overlapping fields of view ensures that both sets of detectors will respond to size variations in the articles being scanned in a proportional manner If the visible-sensitive signal of the scanner is divided by the infrared-sensitive signal of the scanner with an external ratiometric control apparatus so as to form a ratio of the two signals, it is clear that the ratio thus derived will not vary with respect to size variations in the articles being sorted since size variations always affect both signals in the same proportion.

Thus, the infrared-sensitive signal may be regarded as a size reference for the articles being sorted since it may be used to form a ratio with the visible-sensitive signal which ratio varies only with visible color variations of the articles. Additionally, it can be seen that the infrared signal may be used as a fairly accurate absolute measurement for alleviating articles that are too small.

By shifting one spectral response region of the color ratiometric system into the infrared, satisfactory isolation of the two spectral responses can now be obtained with the use of relatively inexpensive optical filters. The visible spectral response detectors are fitted with an infrared blocking filter.

Figure 12:
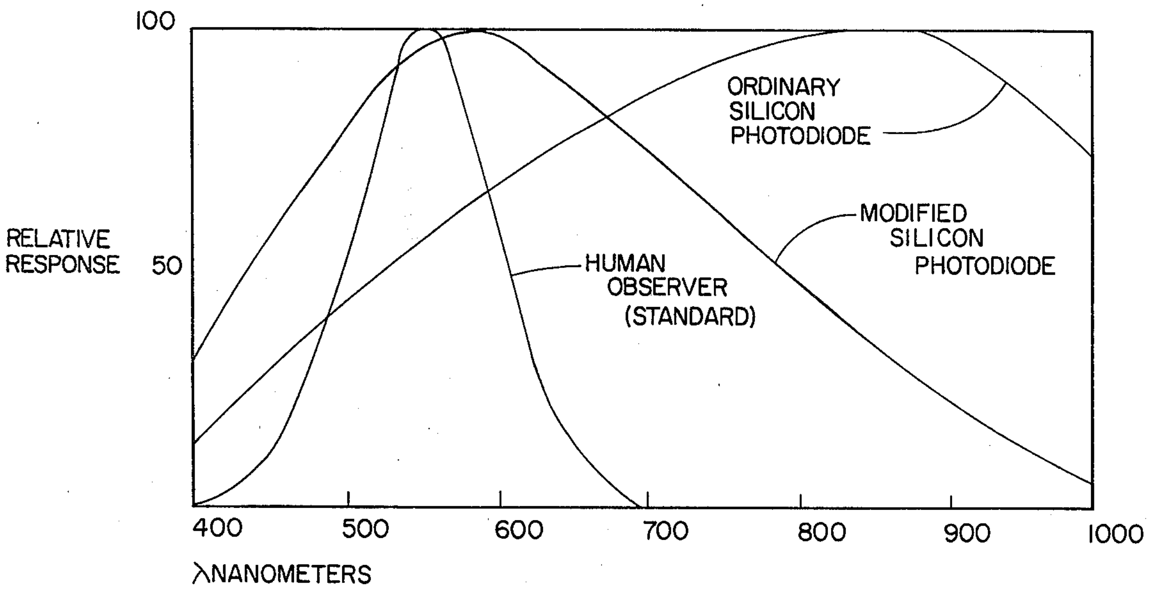
FIG. 12 is a series of curves showing the relative spectral response characteristics of the preferred photodiode with respect to that of a human observer and an ordinary silicon photodiode.

Silicon photodiodes operated in the short circuited current mode (into an operational amplifier summing junction) exhibit a very linear response to the level of radiant energy falling on them. They have exceptional time related gain stability but exhibit a sensitivity-temperature coefficient of approximately ±0.6%/°C. in the current mode. However, their sensitivity matches to approximately ±0.05%/°C between cells of the same manufacturing batch, thus providing good gain compensation over any reasonable ambient temperature range. Advantage is taken of this batch-related temperature tracking characteristic in the preferred embodiment of the scanner by using the same type of modified planar diffused silicon photodiode as both visible-sensitive and infrared sensitive photodetectors, modifying the characteristic spectral response of the diode in each case by the use of one or another selective optical filter. One type of such photodiode found satisfactory for use in this invention is the modified planar diffused silicon photodiode, manufactured by Sensor Technology of Los Angeles. The relative peak spectral response of this device is at 555 nanometers thus substantially matching the peak response of the human eye (FIG. 12).

The characteristic response to the preferred photodiode is attenuated in the infrared region relative to the response of an ordinary silicon photodiode. This characteristic, in combination with the reduced blue emission of the preferred illuminating lamps, provides for visible and infrared-sensitive signals having substantially equal magnitudes over a wide range of varieties of sorted articles. The illuminating lamp used in this invention and found to be satisfactory is a line filament lamp manufactured by Illuminated Products of Los Angeles.

Figure 13:
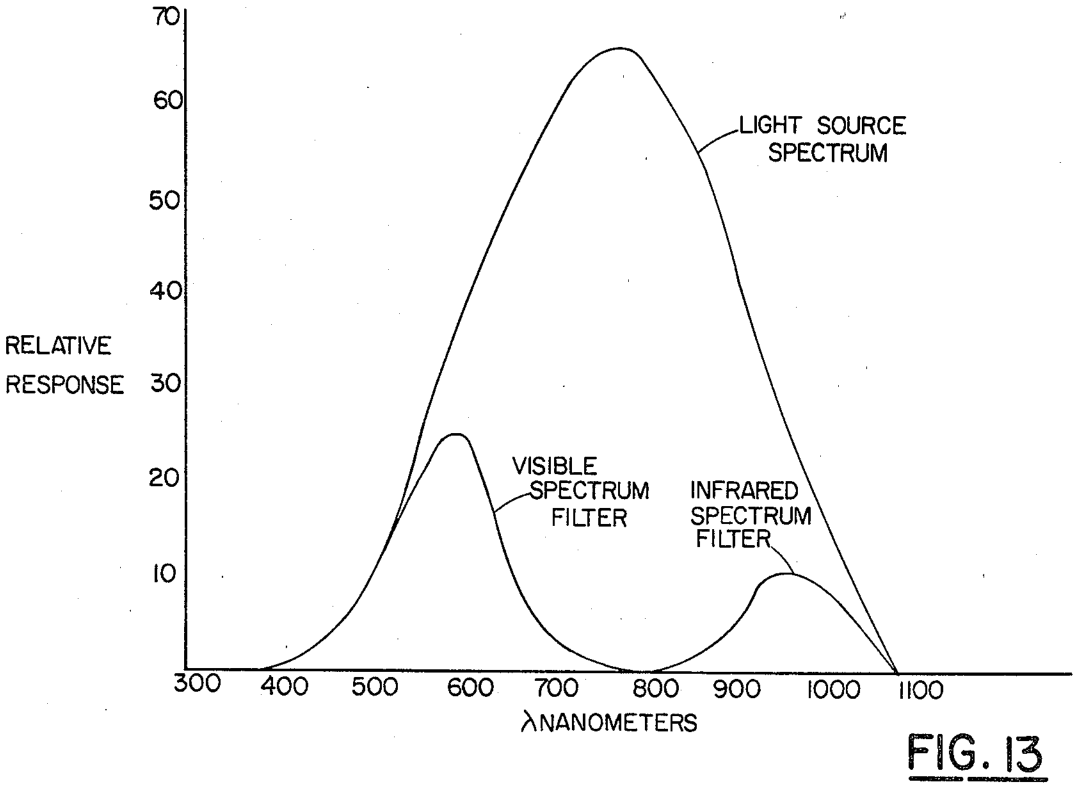
FIG. 13 is a series of curves showing the relative spectral response of the illuminating lamps and the combined photodiodes and filters.

FIG. 13 shows the relative spectral response of the lamp and the two filtered relative responses of the photodiodes in the visible spectrum (centered at about 600 nanometers) and the infrared spectrum (centered at about 950 nanometers).

To signals, generated, respectively, by the scanner visible and infrared spectrum detectors, may be connected to two processing amplifiers having substantially equal gain. One signal can be inverted in polarity from the other for the purpose of obtaining a ratio and the well-matched temperature tracking characteristic of the two sets of photodiodes interact in the ratio-detecting circuitry so as to cancel each other out. In this manner, a color variation sensitive ratio is obtained which is not only insensitive to article size but to photodetector thermal drift as well.

A further advantage of using the preferred photodiode with its attenuated infrared response is to allow the use of inexpensive commonly available infrared blocking filters with the visible-sensitive set of photodiodes. These filters, while providing excellent infrared absorption in the spectral region of interest, all exhibit unwanted transmission further into the infrared spectrum. The preferred photodiode is not sensitive to this latter region, whereas the normal silicon photodiode is. Thus, it can be seen that by the combination of light source color temperature stability, silicon photodiode tracking and production sensitivity matching, gain stability is obtained without the need for separate optical and electronic reference sources by providing a single light source and a single type of detector modified only by inexpensive filters.

Referring now to the drawings in detail, there is shown a dust-resistant housing 10 for the optical and photoelectric device assemblies of this invention. The assembly includes a pair of parallel panels 11 and 12 which in this embodiment are insulating printed circuit-boards having thereon a plurality of printed circuit conductors and to which are adhered a pair of cones 13 and 14, respectively, to support the photodiodes. The panels are positioned parallel to one another and perpendicular to a silica glass sleeve 15 which extends through the middle of the housing to form a passage 16 for the passing therethrough of small particles such as a bean 8 being inspected. Cones 13 and 14 each support six photodiodes (described further below) divided into two groups or arrays surrounding silica glass sleeve 15.

The illuminating lamps 19, 20, 21 and 22 are affixed to the appropriate electrical conductors of panel 11. The lamps are preferably of the type described above. The lamps are supported by the conductive leads extending from each end of each lamp's glass envelope (FIGS. 6 and 7), and are further supported and restrained by silicon rubber cement after optical alignment has been accomplished. The lamps 19, 20, 21 and 22 may be provided with a reflective coating 19*a*, 20*a*, 21*a* and 22*a* applied to a portion of the outer surfaces thereof so as to gather more of the energy from the filament. Associated with each of the lamps 19, 20, 21 and 22 are collimating lenses 23, 24, 25 and 26. These lenses are joined together by having the extreme ends attached to spacers 27, 28, 29 and 30 by the use of a suitable cement to thereby form a substantially square self-supporting unit which together with the two panels 11 and 12 are assembled in a parallel spaced relationship so as to provide an illuminating plane perpendicular to the path of the articles.

The lens assembly maintains the parallel spacing by use of the tubular threaded spacers 31, 32, 33 and 34 and the corresponding spacers 31*a*, 32*a*, 33*a* and 34*a* in combination with suitable machine screws 60 passing through the panels 11 and 12 and the respective corner spacers 27, 28, 29 and 30 of the lens assembly for the purpose of binding the panel assembly together and to support and position it within the housing 10.

The arrangement of photodiodes 35, 36, 37, 38, 29 and 40 that are attached to the cone 13 mounted to panel 11 is shown in FIGS. 1–4 with a similar array of photodiodes 35*a*, 36*a*, 37*a*, 38*a*, 39*a* and 40*a* being attached to the cone 14 and mounted to panel 12. Photodiodes 35, 37, 39, 35*a*, 37*a* and 39*a*, forming one group representing one half of the array are each covered by an optical filter material 41 which transmits radiation predominantly in the infrared portion of the spectrum.

FIG. 13 shows the relative spectral responses for the light sources 19–22 and for the infrared and visible spectrum filters. The infrared filter has a pass band of approximately 850 to 1050 nanometers. One suitable filter material is manufactured by Schott Optical of Germany and designated RG1000. Photodiodes 36, 38, 40, 36*a*, 38*a* and 40*a*, forming the other group representing the other half of the array are geometrically interspersed with photodiodes 35, 37, 39, 35*a*, 37*a* and 39*a* and are each covered by an optical filter material 42 which transmits radiation predominantly in the visible portion of the spectrum.

FIG. 13 shows the relative spectral response for the visible spectrum filter, having a pass band of approximately 450 to 750 nanometers. One suitable filter material is manufactured by Schott Optical of Germany and designated BG 38. Photodiodes 35, 37 and 39 are connected electrically in parallel to the appropriate printed circuit conductors on panel 11 which further connects through connector 43 (see FIG. 7) to the input of electronic apparatus 44 and photodiodes 36, 38 and 40 are connected in the identical manner to the input of the electronic apparatus 45. Photodiodes supported in cone 14 mounted to panel 12 are connected electrically to printed circuit conductors on panel 12 in the same manner as the devices in cone 13 are connected to panel 11. Thus, light striking a particular area of an article or bean 8 is "seen" by at least two different wavelength responsive photodiodes, such as 35 and 38*a* and/or 35 and 36, etc.

Figure 9:
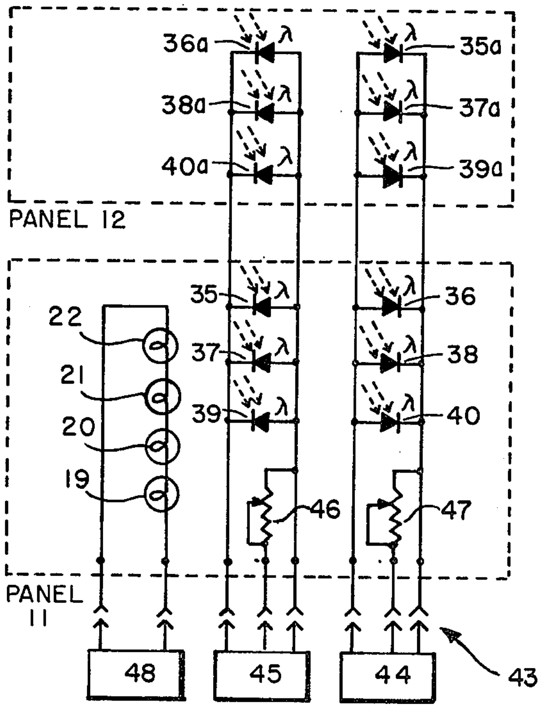
FIG. 9 is a schematic drawing of the circuit of the optical scanner.

FIG. 9 is a schematic diagram of the invention wherein the photodiodes 35, 36, 37, 38, 39 and 40 as well as their counterparts 35*a*, 36*a*, 37*a*, 38*a*, 39*a* and 40*a* are shown together with potentiometer 46 and 47 connected through connector 43 to the remotely located electronic devices 44 and 45. Also shown are lamps 19, 20, 21 and 22 connected to a regulated power supply 48. The electronic devices 44 and 45 are of the preferred type disclosed in the previously identified application Ser. No. 687,949, entitled: CONTROL APPARATUS FOR SORTING PRODUCTS. The cones 13 and 14 are assembled in an identical manner to panels 11 and 12. Thus, when said panels are joined as shown in FIGS. 1 and 7, the photodiodes assume an orientation such that devices responsive in the visible spectrum are either directly above or directly below devices responsive in the infrared region as shown in FIGS. 1–4. Thus, it can be seen that the devices view substantially identical areas of the article and that their fields of view overlap considerably.

The mounting surfaces of cones 13 and 14 are configured such that they are substantially tangent to the surface of an oblate spheroid in order to maximize the interior field of view of the product passing through the sheet of light and minimize interference from external light sources as well as preventing the devices from receiving direct light from the illuminating source. This is primarily insured by the fact that panels 11 and 12 extend substantially to the sleeve 15, thereby serving as a light baffle between each lamp-lens combination and the photodiodes opposite it.

Referring now to the illumination system, the lamp 19 is positioned at the focal point of the lens 23, thereby generating a collimated homogenous "sheet" of light of controllable thickness and substantially uniform flux density through which an article such as bean 8, passes. The lenses 23–26 are masked with an opaque material along its top and bottom sides and along the top and bottom portions of the side facing inward toward bean 8 in order to eliminate stray reflections outside the free aperture of the lens.

The difficulty in designing and manufacturing an economically practical high speed feeding apparatus which will propel each article along an identical path with identical orientation makes it essential for the scanner to allow for normal feed pattern "wandering". In other words, the target area must be reasonably broad. In order for the scanner to be insensitive to this phenomenon, the response to reflected light must be substantially uniform in the expected target area. To this end the lamp and lens combinations are positioned so that they produce a homogenous "sheet" of light from four directions which overlap, thereby producing substantially uniform illumination regardless of the position of the article passing through said "sheet". This combined with the fact that the photodiodes are further matched for sensitivity during the assembly process ensures the high accuracy required for economical sorting of the aforementioned products. To enhance the homogeneity of the light band, the lamp used has its filament held in tension while hot, consequently it always remains at the focal point of the lens without sagging. An additional factor in making the response uniform is the symmetrical arrangement and balanced sensitivities of the photodiodes. It can thus be seen that the scanner response is substantially independent of article position.

The combination of uniformity of response and the widely overlapping fields of view of the photodiodes makes the scanner insensitive to particle orientation. For this reason a spot or blemish will consistently be detected regardless of its position on the product being inspected. Further, since it is not an image forming device, the presence of a spot or discoloration is detected solely by variations in the ratio due to variations in the scanner output signals. Because normal localized color variations, such as the "black eye" in blackeyed peas are substantially consistent in color density and are proportionally consistent in size from bean to bean, the "black eye" will affect the output signals uniformly, thus the ratio threshold which is used as a basis for accepting or rejecting the bean can be adjusted in the previous identified circuit apparatus to allow for the "black eye" and will therefore reject a bean only if additional discoloration or blemishes are detected. It can be seen that such additional defects will cause the output signal ratio to change more than the allowed amount.

Figure 5:
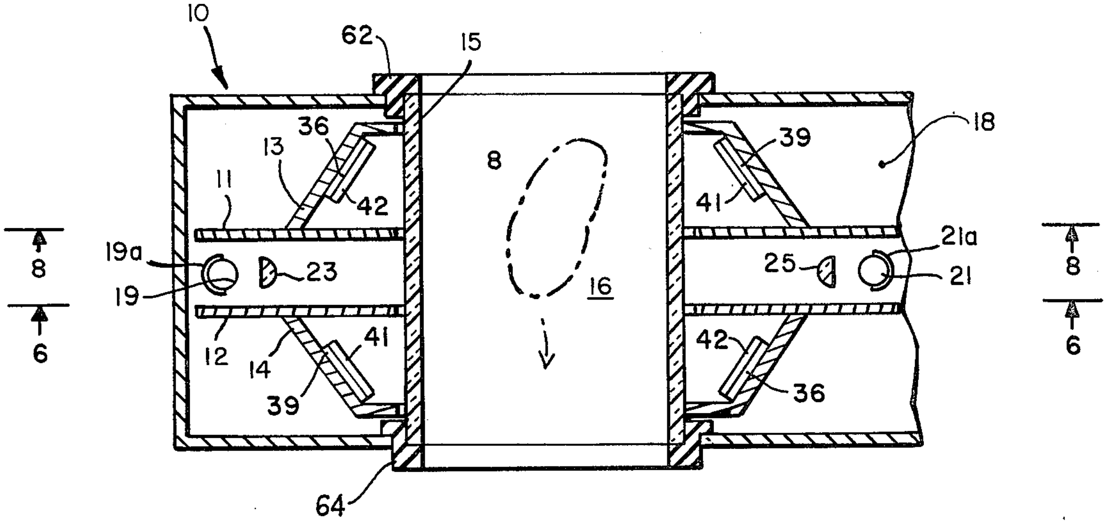
FIG. 5 is a cross-sectional side elevational view of the embodiment of FIG. 1.
Figure 8:
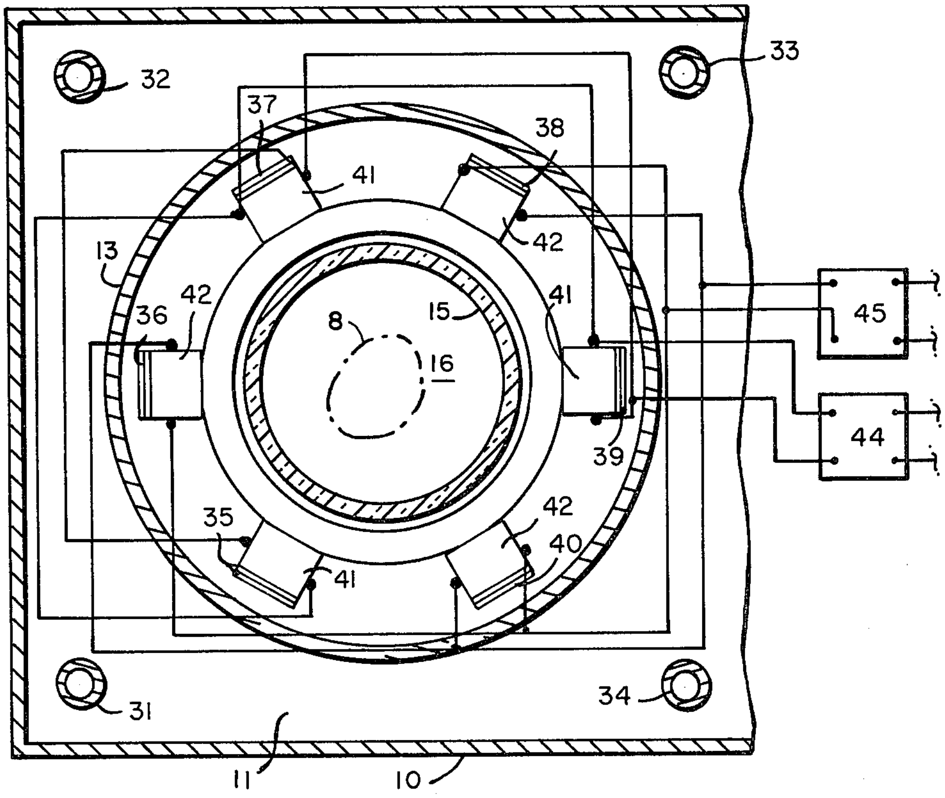
FIG. 8 is a cross-sectional plan view along section line 8—8 of FIG. 5, also showing part of the electrical circuit in schematic form.

The collection of dust and particles in a nonuniform manner within the enclosed volume 18 (FIGS. 1 and 5) can readily affect adversely the optical properties of the scanner and thereby reduce its accuracy. Thus, the enclosed volume 18 is effectively sealed by rubber O-rings 62 and 64 that provide a seal between the tube 15 and the enclosure 10. Also, a further rubber sealing ring 66 effectively seals enclosure 10 to a front panel 68. Panel 68 includes a twist-lock screw 70 for holding the entire device in place in a panel assembly or the like (not shown). Thus, the preferred embodiment is in the form of an easily installed and replaceable module, reducing down time in the event of the failure of a module.

Dust and particles which collect on the externally exposed inward facing surface of sleeve 15, due to static electricity, tend to accumulate in a uniform manner and the buildup ceases as soon as the static charges have been neutralized by the dust already accumulated. Thus, in normal long term operation a thin, uniform and only slowly varying layer of dust and small particles will be present on the sleeve. This layer acts as a neutral density filter which uniformly attenuates the illuminating source and the light reflected from the product being inspected. This attenuation affects all of the photodetectors equally and thus does not affect the ratio of the two output signals from the scanner. The small particles which may accumulate on the sleeve do not significantly degrade the scanner since it is not an image-forming device. Therefore, the scanner is not affected by normal dust contamination and does not require routine cleaning.

A further benefit gained is that the high accuracy and previously described gain stability eliminate the need to use different optical filters for a different variety of products. Since the detection in the infrared spectrum essentially constitutes a "reference" (not a fixed reference, however), which varies as the product variety varies, it can be seen that the "reference color standard" is the product itself and that therefore background color standards in conjunction with optimized filter selection are not needed and that the selection of a compromise optical filter material that performs well in the visible spectrum can be made. Thus, filters are adhered directly to the photodiodes within the sealed volume 18. Also response gains are set by adjusting potentiometers 46 and 47 (see FIG. 5) as a part of the manufacturing process— thus absolutely no operator adjustments are available nor are they needed.

As has been previously described, the product to be inspected is scanned by means of passing the article through a thin "sheet" of light which "sheet" or light band is preferably smaller than the smallest cross section of the article, rather than illuminating the entire object and limiting the field of veiw of the detectors. This allows the articles to pass through various positions in the scanner and still be uniformly illuminated and detected whereas any three dimensional array of slit covered detectors cannot be so aligned as to converge uniformly except at one point.

It can, therefore, be seen that since the invention utilizes the detectors in a wide viewing mode they have inherently better noise performance than slit detectors since the entire active surface of each photodiode is used for detection purposes. Also, when illuminating and detecting reflectance from a narrow band of light, the actual position of the article is more precisely detected, making it easier to time and reject the article when desired. In other words, where the precise position of the article is known, the arrival of the article at subsequent positions is predictable and presents no problem for control of whether to reject or accept the article. Further, since this control can be made very precise, adjacent articles that are in a very close time/space relationship are not as likely to be rejected.

The lightband generated by the combination of a lamp and collimating lens can be made either narrower or wider by using the same inexpensive molded plastic lens and by varying the size of the line source of light placed at the focal point of the lens. Thus, the lamp means used in the preferred embodiment can easily be replaced by another appropriate light source and slits introduced at the focal point so as to produce a lightband of any desired thickness and color characteristic limited only by the free aperture of the lens.

It can thus be seen that when sorting product where it is desirable to detect spots, in other words where normal localized color spots are absent, the field of view may be narrowed as previously described such that the area of discoloration represents a greater percentage of the total area being illuminated at any one time and thus the change in light reflected will be of a higher percentage of the total light reflected and more easily detected in the electrical signals generated by the photodiodes, whereby the apparatus becomes a very efficient spot scanner.

It is, therefore, readily apparent that for specific sorting applications the scanner may be made sensitive to smaller and smaller spot defects by providing progressively narrower bands of illumination. Furthermore, as embodied in the preferred processing electronics previously identified, the signal outputs from the scanner can be electronically time-averaged so that the reflected light or color information from each individual article is accumulated as the article passes through the narrow field of illumination. In this manner, the band of illumination is effectively widened electronically and a ratio may be formed which depends only on the average or overall color characteristics of the particular article being inspected. At the same time, the non-averaged or instantaneous localized signal outputs from the scanner are still available to be processed for spot detection. Thus, without any internal modification or adjustments whatsoever, the scanner may be used as a spot detector or as an average color detector (as in the sorting of certain types of multicolored seedbeans such as Scarlet Runners which are entirely spotted).

Simplicity of design is accomplished by using, whenever possible, components for a multiplicity of purposes such as using the panels 11 and 12, which are planar printed circuitboards, to support the lamps, cones 13 and 14 and when assembled as shown in FIGS. 1 and 7, to act as optical baffles as well as support for the lens assembly.

Figure 10:
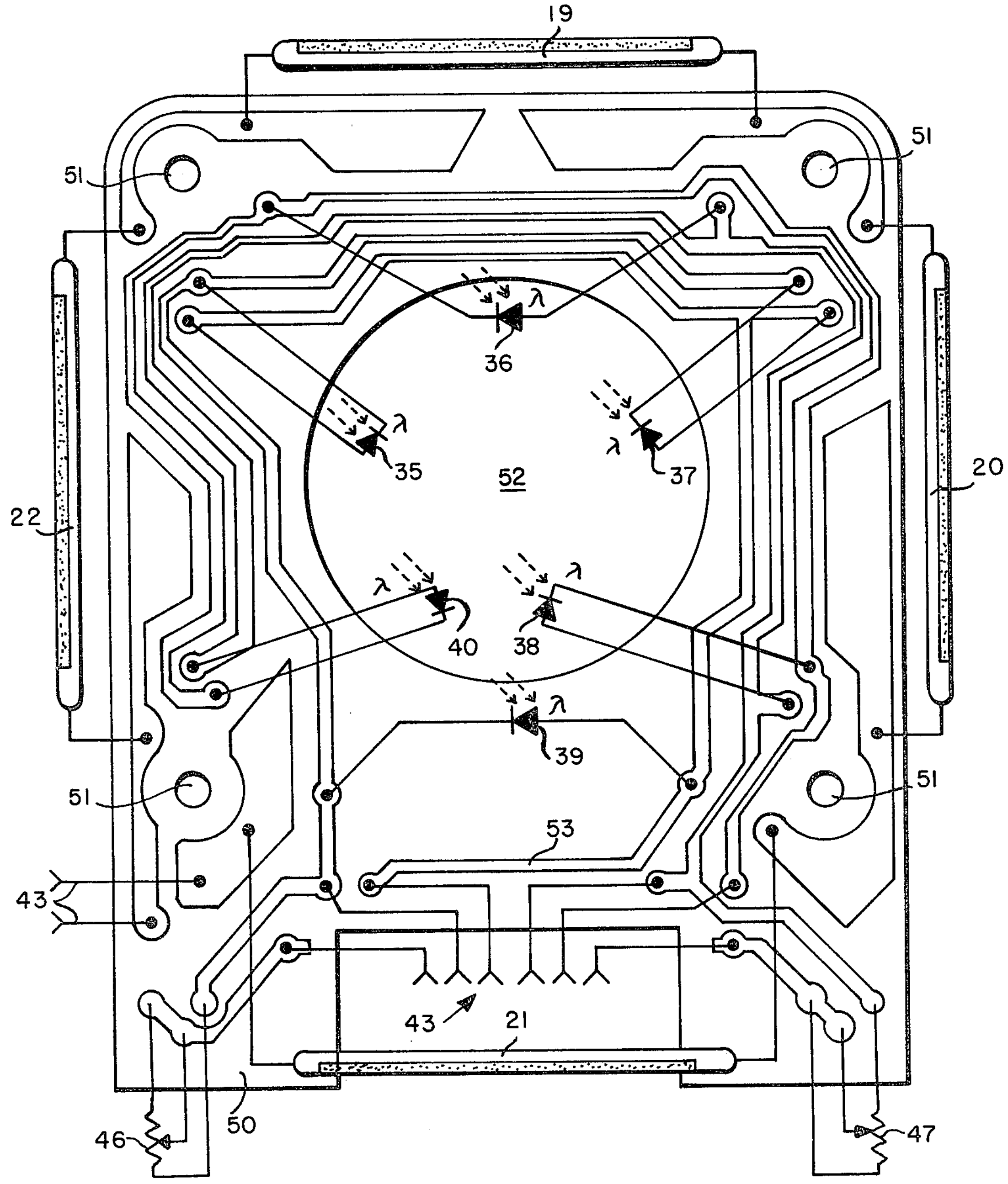
FIG. 10 is a plan view of the printed circuit of the scanner showing some optical and electrical components in schematic form.

The construction of panel 11 is shown in FIG. 10. The planar board 50 is formed having openings 51 for attachment to the tubular spacers 31, 32, 33 and 34 by the passage therethrough of machine screws 60 and an opening 52 for the penetration of sleeve 15. A plurality of printed circuit conductors 53 are fixed to the board to which the lamps, photodiodes and gain adjustment potentiometers are electrically connected. Thus, as is shown in this drawing, the lamps 19, 20, 21 and 22 are connected to the board by their respective electrical conductors and supported in planar configuration surrounding the opening 52. Also connected to the printed circuits are photodiodes 35, 36, 37, 38, 39 and 40 as shown in FIG. 1. Also connected to the circuit board are potentiometers 46 and 47 which are used for presetting the gain of the two color channels. This setting is done in the process of assembly and need not be further adjusted by the operator.

Figure 11:
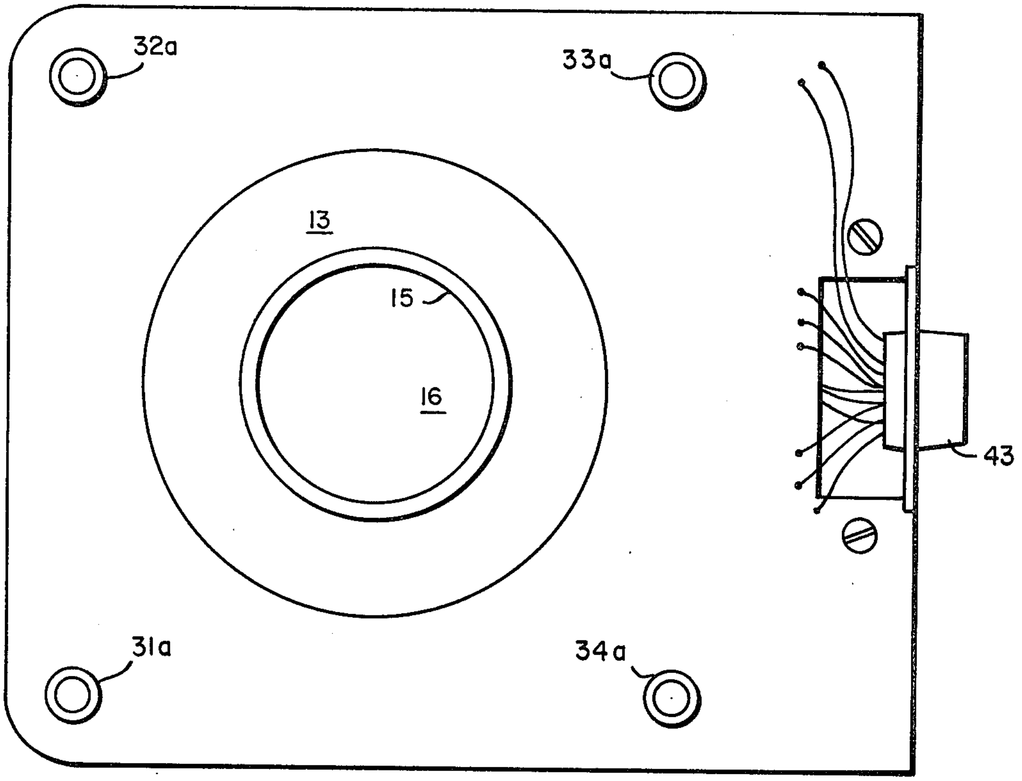
FIG. 11 is a top plan view of the optical scanner.

There are further connected to the printed circuitboard a plurality of electronic component parts shown generally at 70 (FIG. 3) of the electronic devices 44 and 45 and a connector 43 for attachment of the optical scanner to the remotely located remainder of the electronic devices 44 and 45 as well as connecting to the power supply 48 (see also FIG. 9) for the lamps 19, 20, 21 and 22. The panel 12 (shown in FIG. 11) is of similar fabrication to the panel 11 except that it need only have printed circuit conductors to connect photodiodes 35*a*, 36*a*, 37*a*, 38*a*, 39*a* and 40*a* to interconnecting wires which are connected to the appropriate conductors on the panel 11.

From the foregoing description it can be seen that there is provided a compact and effective and very accurate optical scanner which permits viewing of articles passing through the cylindrical passage 16 by providing light from the lamps and thereafter detecting selected wavelengths of reflected light through the photodiodes to determine certain optical characteristics of the articles. By the proper detection of these characteristics through the electronic circuitry either of a standard design or similar to the preferred circuitry identified in the copending application heretofore identified, the articles can be properly sorted for alleviating those having undesirable characteristics.

Further, the scanner is modular and is made substantially dustproof by the combination of the sleeve 15, the housing 10 and the seals 62, 64, and 66 and the sealing of connector 43 which passes through the front panel 68. Since the scanner is modular it may be removed for servicing from one of the channels of a multichannel apparatus without requiring shutdown or more than the channel affected. Further, since all units are factory calibrated, a replacement may be inserted while servicing is accomplished, thereby reducing loss of productive time to an absolute minimum.

While a particular embodiment of the present invention has been described and shown, it should be understood that the system is capable of modification and variations without departing from the principles of the invention and that the scope thereof should be limited only by the proper scope of the claims appended hereto.

We claim:

1. In apparatus for sorting articles, an optical scanner comprising the combination of:

means defining a passage through which said articles may pass, illuminating means substantially surrounding said passage for forming a multidirectional sheet of light of substantially uniform thickness in the visible and infrared spectra extending normal to and through said passage, and light detecting means adjacent said passage for generating signals responsive to light reflected from articles passing through said sheet of light, said light detecting means including means for detecting light in the visible spectrum and for generating signals in response thereto and means for detecting light in the infrared spectrum and for generating signals in response thereto.

2. The combination of claim 1 wherein said illuminating means forms a multidirectional thin sheet of light having a width along said passage less than the smallest cross-sectional dimension of a typical one of said articles.

3. The combination of claim 1 further comprising means for shielding said light detecting means from receiving direct light from said illuminating means.

4. The combination of claim 1 wherein said visible spectrum light detecting means and said infrared spectrum light detecting means each include a plurality of light detecting devices, said devices being mounted to provide overlapping fields of view for pairs of visible spectrum and infrared spectrum light detecting devices.

5. The combination of claim 4 wherein said visible and infrared spectrum light detecting means each comprise modified planar diffused silicon photodiodes having a peak spectral response at about that of the human eye.

6. The combination of claim 5 wherein said visible spectrum light detecting means further comprises visible spectrum filter means altering the response of said photodiodes to retain said peak response at about that of the human eye and to provide substantially no response in the infrared region.

7. The combination of claim 6 wherein said infrared spectrum light detecting means further comprises infrared spectrum filter means altering the response of said photodiodes to provide a peak response in the infrared region and substantially no response in the visible region.

8. The combination of claim 7 wherein said visible spectrum filter means alters said photodiode response to provide substantially no response above 800 nanometers.

9. The combination of claim 8 wherein said infrared spectrum filter means alters said photodiode response to provide substantially no response below 800 nanometers.

10. The combination of claim 9 wherein said illuminating means includes lamp means having a spectral peak at about 750 nanometers and provides usable output from about 400 nanometers to 1100 nanometers.

11. The combination of claim 3 wherein said illuminating means includes line filament lamp means having a spectral output in the visible and infrared spectra and cylindrical lens means receiving light from said lamp means for generating a homogeneous, uniform narrow band of light normal to said passage.

12. The combination of claim 1 wherein said means defining a passage comprises a transparent hollow sleeve.

13. The combination of claim 12 further comprising a dust proof enclosure for said optical scanner having first and second openings for the ends of said hollow sleeve and sealing means for providing a dust proof seal between said enclosure and said sleeve.

14. The combination of claim 11 wherein said line filament lamp means includes a plurality of line filament lamps and spring means for maintaining the filaments of said line filament lamps in tension to maintain the filaments in alignment with said cylindrical lens means.

15. The combination of claim 1 wherein said light detecting means receives unfocused reflected light.

16. The combination of claim 4 wherein said light detecting means receives unfocused reflected light.

17. In apparatus for sorting articles, an optical scanner comprising the combination of

- means defining a passage through which said articles may pass,
- illuminating means substantially surrounding said passage for forming a multidirectional sheet of light of substantially uniform thickness in the visible and infrared spectra extending normal to and through said passage, and
- unfocused light detecting means adjacent said passage for generating signals responsive to light reflected from articles passing through said sheet of light.

18. The combination of claim 17 wherein said light detecting means comprises means for detecting light in first and second spectra pass bands.

19. The combination of claim 18 wherein said means for detecting light in first and second pass bands of energy spectra includes a plurality of means for detecting light in said first pass band and a plurality of means for detecting light in said second pass band, each of said plurality of means being mounted to provide overlappinng fields of view for pairs of first pass band and second pass band means.

20. In apparatus for sorting articles, an optical scanner comprising the combination of:

- means defining a passage through which said articles may pass,
- illuminating means adjacent said passage for forming a sheet of light in the visible and infrared spectra extending normal to said passage, and
- light detecting means adjacent said passage for generating signals responsive to light reflected from articles passing through said sheet of light, said light detecting means including means for detecting light in the visible spectrum and for generating signals in response thereto and means for detecting light in the infrared spectrum and for generating signals in response thereto, said visible spectrum light detecting means and said infrared spectrum light detecting means each including a plurality of light detecting devices, said devices being mounted to provide overlapping fields of view for pairs of visible spectrum and infrared spectrum light detecting devices.

21. The combination of claim 20 wherein said illuminating means forms a multidirectional thin sheet of light having a width along said passage less than the smallest cross-sectional dimension of a typical one of said articles.

22. The combination of claim 20 further comprising means for shielding said light detecting means from receiving direct light from said illuminating means.

23. The combination of claim 22 wherein said illuminating means includes line filament lamp means having a spectral output in the visible and infrared spectra and cylindrical lens means receiving light from said lamp means for generating a homogeneous, uniform narrow band of light normal to said passage.

24. The combination of claim 20 wherein said means defining a passage comprises a transparent hollow sleeve.

* * * * *